Oct. 29, 1957   J. H. DAVIDSON   2,811,074
CYLINDER END ANGULARITY GAGE
Filed Nov. 30, 1954   3 Sheets-Sheet 1
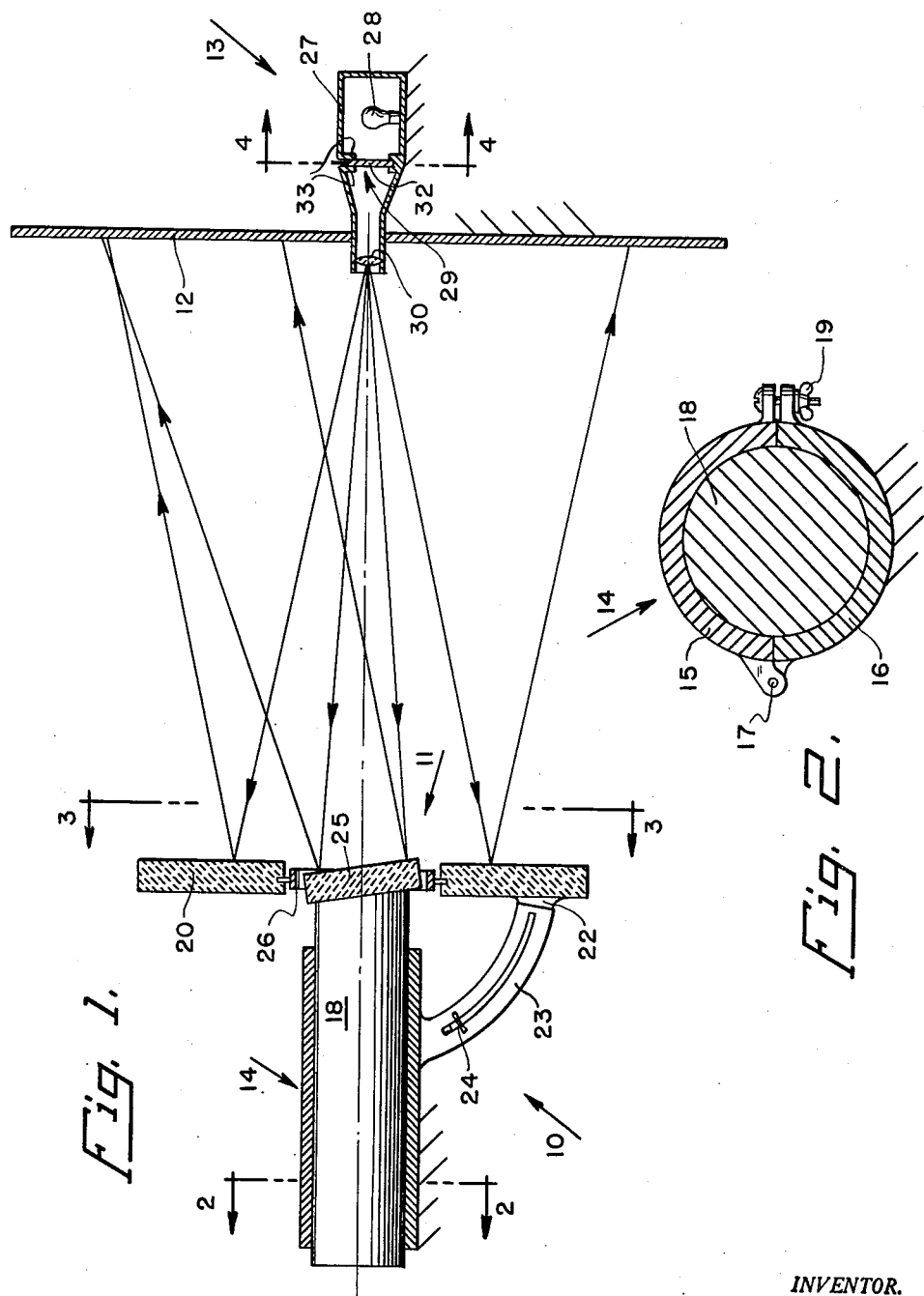
INVENTOR.
JACK H. DAVIDSON
BY
ATTORNEYS Oct. 29, 1957 J. H. DAVIDSON 2,811,074
CYLINDER END ANGULARITY GAGE
Filed Nov. 30, 1954 3 Sheets-Sheet 2

INVENTOR.
JACK H. DAVIDSON
BY
ATTORNEYS

Oct. 29, 1957 J. H. DAVIDSON 2,811,074
CYLINDER END ANGULARITY GAGE
Filed Nov. 30, 1954 3 Sheets-Sheet 3
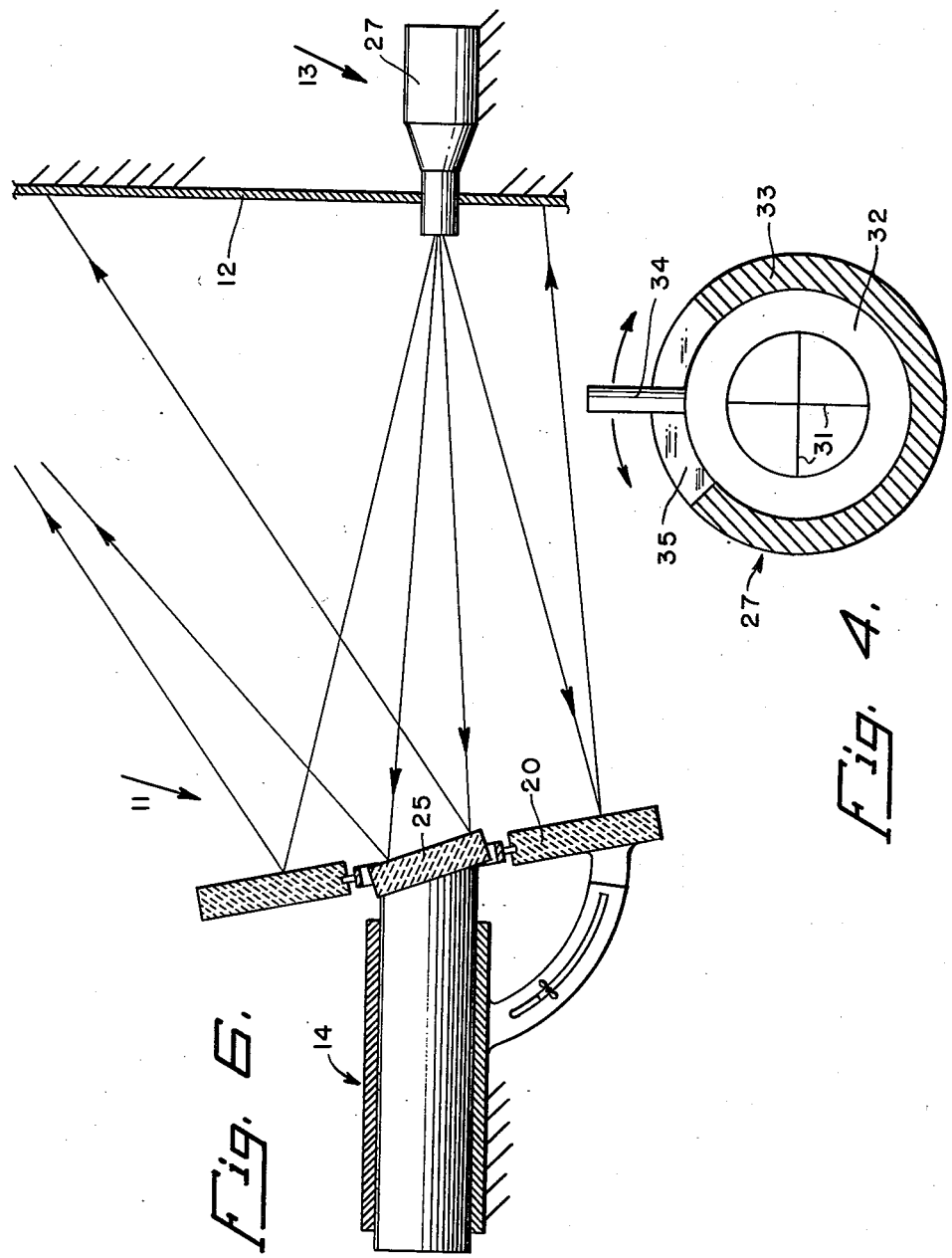
INVENTOR.
JACK H. DAVIDSON
BY
ATTORNEYS United States Patent Office 2,811,074
Patented Oct. 29, 1957

2,811,074
CYLINDER END ANGULARITY GAGE
Jack H. Davidson, China Lake, Calif.
Application November 30, 1954, Serial No. 472,270
2 Claims. (Cl. 88—14)
(Granted under Title 35, U. S. Code (1952), sec. 266)

The invention described herein may be manufactured and used by or for the Government of the United States of America for governmental purposes without the payment of any royalties thereon or therefor.

The present invention relates to gages and more particularly to a gage for determining or checking the angular inclination of the end face of an elongated body relative to the axis of the body.

It is frequently desirable or necessary in the fabrication of cylindrical or other elongated parts that the plane of an end face of the part be disposed normal to or at a given angle to the longitudinal axis of the part within certain tolerances. To enable a check to be made as to whether the angular disposition of the plane of the end face relative to the axis is within the prescribed tolerances, it is necessary that some form of gage be applied to the part. Heretofore, various gages for performing the aforementioned function have been proposed. One such prior gage comprised merely a hand "square," or the like, which was manually applied to the part to be checked and the discrepancy between the "square" and the end surface was determined by means of a feeler gage. Trial and error was resorted to in determining the maximum angle position. It will be appreciated that such an arrangement was time consuming to employ, completely unsuitable for mass production methods, inaccurate, fatiguing, and subject to careless application.

The present invention provides an improved end angularity gage which avoids the disadvantages inherent in the prior gaging arrangements. The invention comprises, generally, a fixed optical system for projecting onto a universally mounted mirror arrangement, carried by a fixed structure supporting the part to be checked, a cross-hair image, or the like, which image is reflected from the mirror onto a fixed screen. The screen is provided with or has projected thereon certain reference lines, or the like, disposed in predetermined positions relative to the supporting structure whereby when the mirror is aligned parallel to the end surface of the part, as by moving such surface into abutting relation with the mirror, the relative positions of the image and fixed reference lines provides an indication of the angularity of the end surface relative to the axis of the part.

Other objects and numerous advantages of the invention will become apparent as the same becomes better understood from the following detailed description had in conjunction with the annexed drawings wherein:

Fig. 1 is a semi-diagrammatic view of the invention in longitudinal cross-section, the parts being arranged to check the angularity of the end surface of a cylinder relative to a plane normal to the cylinder axis;

Fig. 2 is a sectional view taken along line 2—2 of Fig. 1;

Fig. 4 is a sectional view taken along line 4—4 of Fig. 1;

Figure 5A:
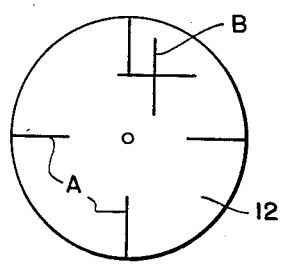
Figure 5B:
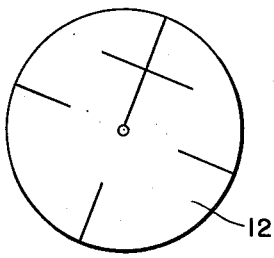
Figure 5C:
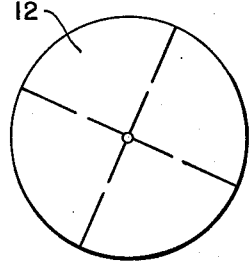

Figs. 5a, 5b, and 5c show views of the cross-hair image on the screen under varying conditions with the parts arranged as in Fig. 1.

Figure 7A:
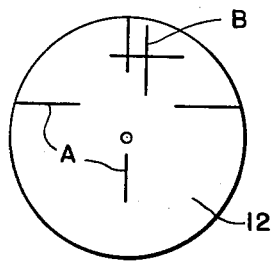
Figure 7B:
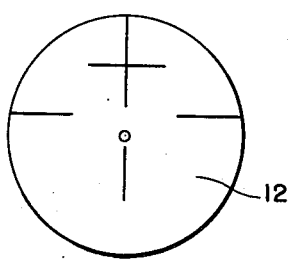
Figure 7C:
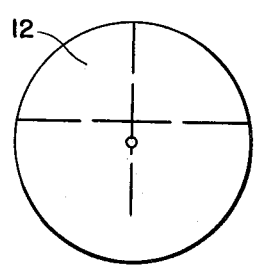

Fig. 6 is a view similar to Fig. 1 with the parts arranged to check the angularity of the end surface of a cylinder relative to a plane disposed at a given angle relative to the cylinder axis; and Figs. 7a, 7b, and 7c show views of the cross-hair image under varying conditions with the parts arranged as in Fig. 6.

Referring now to the drawings and more particularly to Fig. 1, the preferred embodiment of the present end angularity gage comprises broadly a fixed structure 10 for supporting the part to be checked, a mirror assembly 11, a viewing screen 12, and an optical projection system 13. Supporting structure 10 may, where the part to be checked is cylindrical as illustrated in the drawings, comprise an elongated, generally hollow cylindrical shell 14 comprising a pair of semi-cylindrical shell portions 15 and 16 pivotally connected as at 17 whereby portions 15 and 16 may be opened in fashion of a clam shell to facilitate the insertion of the part 18 to be checked. Suitable means, such as the screw and wing nut arrangement 19, may be provided for securing the portions 15 and 16 together in their closed condition. One of the shell portions 15 and 16, such as the lowermost portion 16, is rigidly attached to a fixed supporting structure as indicated.

Figure 3:
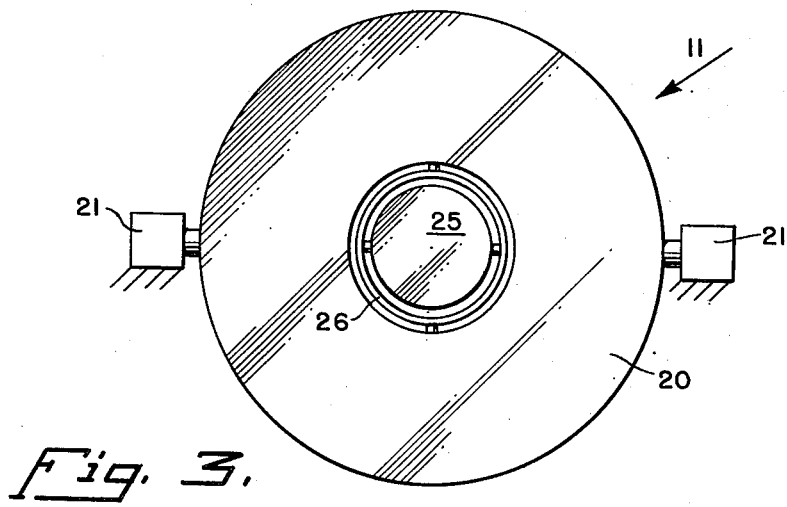
Fig. 3 is a view looking in the direction indicated by line 3—3 in Fig. 1.

Mirror assembly 11 comprises, in the embodiment illustrated, a first annular plane mirror 20 which, as shown in Fig. 3, is mounted on a fixed supporting structure, for pivotal movement about a horizontal axis as by the trunnion arrangement 21, and with its center disposed on the axis of shell 14. A slotted, arcuate adjusting assembly, comprising an arcuate extension 22 fixed to mirror 20, a slotted arcuate extension 23 fixed to shell portion 16, and a screw and wing nut 24 carried by extension 22 and projecting through the slot in extension 23, may be provided for securing the mirror 20 in a desired angular position. Universally mounted within the aperture in mirror 20 is a second plane mirror 25. The universal mount for mirror 25 may comprise a gimbal arrangement as illustrated at 26 or any other suitable universal mounting arrangement. Mirror 25 is preferably disposed with its center on the axis of shell 14.

Viewing screen 12 may comprise any conventional screen provided with a suitable plane viewing surface. Screen 12 is secured to a fixed supporting structure, as indicated, at such a distance from mirror assembly 11 as to provide a desired optical lever and may have its plane normal to axis of shell 14. In the embodiment disclosed, screen 12 is provided at its center with an aperture, as shown, through which may extend a portion of the optical projection system 13.

Projection system 13, which is shown in somewhat diagrammatic fashion, may comprise a housing 27, which is rigidly mounted on a fixed supporting structure as indicated, a light source 28, a cross-hair arrangement 29, and a suitable optical system 30 having such optical characteristics as to enable an image of the cross-hairs 31 (Fig. 4) to be focused on screen 12 after reflection from mirror assembly 11. Cross-hair arrangement 29 may comprise an annular member 32 which is rotatably mounted in housing 27, as by being slidably disposed between a pair of spaced, annular shoulders 33 within the housing 27. Cross-hairs 31 extend across the aperture in member 32 as shown in Fig. 4. Member 32 may have affixed thereto an operating handle 34 which projects through a slot 35 in housing 27 for effecting angular adjustment of the cross-hairs 31.

Operation of the present end angularity gage will now be described. Work piece 18 is inserted in shell 14 by loosening connection 19 and opening the shell portion 15, and the end face of the work piece is moved into abutting relation with mirror 25 whereby to cause the plane of mirror 25 to move into coincidence with the plane of the end face of the work piece by virtue of the gimbal or other universal mount 26. Subsequent clamping together of shell portions 15 and 16 by the screw and wing nut 19 will tend to straighten out any slight bow or other slight irregularity in the length of work piece 18 whereby to cause the axis thereof to coincide substantially with the axis of shell 14. It will be appreciated that the cylindrical support 14 is illustrative only and that other forms of supports may be employed to accommodate work pieces having cross-sections other than circular in shape. Where it is desired to determine the deviation between the plane of the end face and a plane normal to the axis of the work piece, the plane of annular mirror 20 is adjusted by pivotal movement about its pivotal axis 21 until such plane is normal to the axis of shell 14 as shown in Fig. 1. Wing nut 24 may be tightened to maintain mirror 20 in this normal position, and the arcuate extensions may, if desired, be provided with suitable indicia, not shown, to facilitate such adjustment. Light source 28 is now energized whereby to cause an image of cross-hairs 31 to impinge on both mirrors 20 and 25 and thence be reflected onto screen 12 in a manner substantially as indicated by the dashed lines, representing light rays, shown in Fig. 1. Assuming that the angular position of annular cross-hair holder 32 is such that the cross-hairs will be disposed in vertical and horizontal planes, as indicated in Fig. 4 and that the work piece 18 is inserted in the shell 14 without any attempt to angularly adjust the work piece about its axis in a manner to cause the plane of the maximum angle between the end face and the axis to lie in either the vertical or horizontal plane, the reflected cross-hair image on screen 12 may appear, for example, as shown in Fig. 5a wherein the image segments designated by the letter A are those portions of the cross-hair image reflected from the annular mirror 20 and the segments designated by the letter B are those portions reflected from the universally mounted mirror 25. The fact that neither the horizontal nor vertical parts of image B are aligned with either the vertical or horizontal segments of image A indicates that plane of the aforementioned maximum angle is inclined to both the vertical and horizontal planes. To enable a determination to be made from such an image as to maximum angularity of the end face relative to a plane normal to the work piece axis, would necessitate the measurement of the distances between the horizontal and vertical portions of images A and B and the conversion of such distances, knowing the length of the optical lever, into degrees in the aforementioned maximum angle, the plane of which is inclined to both the horizontal and vertical planes. To facilitate the determination of the maximum angularity, the cross-hair mount 32 is made angularly adjustable whereby to enable either of the cross-hairs 31 to be disposed in the plane of the maximum angle. Thus, as shown in Fig. 5b, cross-hair holder 32 has been angularly adjusted until one of the cross-hairs 31 lies in the maximum angle plane whereby one pair of the opposed segments of image A are aligned with one of the segments of image B. The maximum angle may now easily be determined by measuring a single distance, namely the displacement between the misaligned portions of images A and B and converting such distance into degrees, knowing the length of the optical lever. Moreover, if desired, the gage could be calibrated and the segments of image A provided with suitable indicia for enabling the degrees in the maximum angle, corresponding to a given displacement between images A and B, to be read directly from the screen. Or, in the alternative, indicia indicating the maximum tolerance limits could be provided whereby to permit a rapid and accurate visual determination to be made as to whether or not a given part falls within the prescribed tolerances. Fig. 5c illustrates the cross-hair image on the screen as it would appear when the end face of the part is truly normal to the axis of the part.

In some instances, it might be necessary that the end face of a part be inclined at a given angle to the axis of the part within certain prescribed tolerances. To this end, annular mirror 20 may, as previously described, be mounted for pivotal movement about a horizontal axis. To check such a part, mirror 20 is angularly adjusted until its plane is inclined at such given angle to the axis of support 14, as illustrated in Fig. 6. In this application of the gage, cross-hair mount 32 is adjusted to place cross-hairs 31 in horizontal and vertical planes. The part to be checked is then inserted into shell 14 and moved axially into abutting relation with mirror 25, as before. If the cross-hair image on the screen shows the vertical portions of image A and B to be offset, as illustrated in Fig. 7a, the part is rotated about its axis to bring such vertical portions into coincidence, as illustrated in Fig. 7b, whereby the plane of the maximum angle of the end surface angularity will be vertical. As in the previously described application of the gage, the degrees in the maximum angle may now be calculated, read directly from the screen, if suitable indicia are provided thereon, or, if indicia indicating maximum tolerance limits are provided, a rapid visual determination may be made as to whether a given part falls within such limits.

It will be appreciated that if the present gage is to be employed exclusively to check a plurality of parts whose end faces are to have the same angularity, mirror 20 might be dispensed with and the relatively fixed reference image A of the cross-hair might be replaced by a set of lines drawn or otherwise placed on the screen 12 in the proper position. In such an application, the cross-hairs 31 would be fixed in the vertical or horizontal planes and the part, to be checked, would be rotated to bring corresponding portions of the projected image and drawn reference lines into coincidence, as described with reference to Fig. 6.

Obviously, many modifications and variations of the present invention are possible in the light of the teachings. It is therefore to be understood that within the scope of the appended claims the invention may be practiced otherwise than as specifically described.

What is claimed is:

1. Apparatus for determining the inclination of a planar end face on an elongated body, such as a cylindrical rod or the like, relative to the longitudinal axis of the body, comprising; a first member having a planar optical reflecting surface and an aperture therein, said first member adapted to be disposed in a fixed position with its reflecting surface normally disposed perpendicular to a fixed reference axis, said reference axis passing through said aperture, a second member disposed within said aperture for universal pivotal movement relative to the first member and having a planar optical reflecting surface, said reflecting surfaces adapted to be disposed in the same plane in one position of movement of said second member and in relative angular positions in other positions of movement of said second member, a viewing screen having a planar viewing surface disposed in substantially parallel relation to the reflecting surface of said first member, light projecting means having an optical axis disposed coincident with said reference axis adapted to project an image of suitable indicia onto the reflecting surfaces of both of said members, the construction and arrangement being such that the relative positions of the reflected images on the screen is a measure of angularity between the reflecting surfaces of said members, said second member having parallel faces, one face adapted to abut said end face of the body when the body is disposed in a position with its longitudinal axis perpendicular to the planar surface of said first member.

2. Apparatus in accordance with claim 1 wherein said projecting means includes cross hairs, the image on the screen reflected by said first member producing a plurality of angularly spaced non-intersecting lines, and the image on the screen reflected by said second member producing intersecting lines.

References Cited in the file of this patent

UNITED STATES PATENTS

| | | |
|---|---|---|
| 2,010,301 | Helfer | Aug. 6, 1935 |
| 2,378,930 | Kendall et al. | June 26, 1945 |
| 2,405,441 | Martin | Aug. 6, 1946 |